(12) United States Patent
Bassirat

(10) Patent No.: US 6,353,729 B1
(45) Date of Patent: Mar. 5, 2002

(54) USING AN RF REPEATER IN CDMA APPLICATIONS TO COMBAT INTERFERENCE CAUSED BY A NON-COLLOCATED RADIO

(75) Inventor: Farhad Bassirat, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/970,682

(22) Filed: Nov. 14, 1997

(51) Int. Cl.[7] .............................................. H04B 7/15
(52) U.S. Cl. ..................... 455/11.1; 455/63; 455/501; 370/315
(58) Field of Search ................. 455/501, 8, 9, 455/446, 448, 63, 11.1; 370/315, 327; 4/10

(56) References Cited

U.S. PATENT DOCUMENTS

| | | | | |
|---|---|---|---|---|
| 4,056,780 A | * | 11/1977 | Faulkner | 455/9 |
| 4,539,706 A | * | 9/1985 | Mears et al. | 455/11.1 |
| 4,727,590 A | * | 2/1988 | Kawano et al. | 455/446 |
| 5,204,970 A | | 4/1993 | Stengel et al. | 455/69 |
| 5,367,533 A | | 11/1994 | Schilling | 375/1 |
| 5,883,884 A | * | 4/1996 | Atkinson | 370/279 |
| 6,078,815 A | * | 10/1997 | Edwards | 455/450 |
| 5,715,519 A | * | 2/1998 | Saeki et al. | 370/201 |
| 5,884,187 A | * | 3/1999 | Ziv et al. | 455/522 |
| 5,924,022 A | * | 7/1999 | Beasley et al. | 455/218 |
| 6,023,625 A | * | 2/2000 | Myers, Jr. | 455/503 |
| 6,088,592 A | * | 7/2000 | Doner et al. | 455/447 |

FOREIGN PATENT DOCUMENTS

| | | |
|---|---|---|
| WO | 97/11537 | 3/1997 |

* cited by examiner

Primary Examiner—William Trost
Assistant Examiner—Tilahun Gesesse
(74) Attorney, Agent, or Firm—Carr & Storm, L.L.P.

(57) ABSTRACT

Use of an RF repeater operable with a CDMA cell base station and collocated with, or located near, an offending base station reduces the effects of interference in the CDMA cell generated by the offending base station and improves communications between the CDMA base station and its subscriber stations which are operating near the offending base station. Out-of-band emissions or intermodulation products (interference) generated by the offending base station (utilizing CDMA, FDMA, TDMA or other type of technology) and falling within the frequency bandwidth of the CDMA channel cause interference with CDMA subscriber stations operating near the offending base station thereby preventing establishment or maintenance of a communications link with the CDMA base station. By deploying an RF repeater at or near the offending base station, the effects of said interference is lessened or reduced thus increasing the coverage area of the CDMA cell. A second RF repeater operable with the offending base station and collocated with, or located near, the CDMA base station may also be used to reduce the effects of interference (or the interference itself) in the CDMA cell generated by offending subscriber stations operating near the CDMA base station. In addition, use of one or more RF repeaters also improves communications between the offending base station and its offending subscriber stations by reducing the effects of interference (or the interference itself) generated by the CDMA base station (upon the offending subscriber stations) and the CDMA subscriber stations (upon the offending base station).

16 Claims, 3 Drawing Sheets

USING AN RF REPEATER IN CDMA APPLICATIONS TO COMBAT INTERFERENCE CAUSED BY A NON-COLLOCATED RADIO

TECHNICAL FIELD OF THE INVENTION

The present invention relates in general to RF communications systems and, in particular, to the use of RF repeaters to combat interference caused by a non-collocated radio in code division multiple access (CDMA) applications within personal, cellular, and other mobile communications systems (PCS, cellular, mobile).

BACKGROUND

Throughout the world, certain radio frequency (RF) bands have been allocated for various types of communications, including personal communications system (PCS), cellular, and other mobile applications. In the United States, the Federal Communications Commission (FCC) has allocated frequency bands in the range of 824–849 and 869–894 MHz; and 1850–1910 and 1930–1990 MHz for such applications. Currently, the 824–849 and 869–894 MHz bands are used for mobile cellular communications and the 1850–1910 and 1930–1990 MHz bands are used for PCS applications. Foreign countries have also allocated certain frequencies for cellular applications, including Japan (870–885; 925–940 MHz), England (917–950; 872–905 MHz), Scandinavia (463–467.5; 453–457.5 MHz), Germany (461.3–465.74; 451.3–455.74 MHz), etc. Additionally, Europe has allocated a separate band (890–915; 935–960 MHz) for digital cellular applications in the Global System for Mobile (GSM) communications system (GSM is a combination of frequency division multiple access (FDMA) and time division multiple access (TDMA)).

In the United States mobile cellular band, the frequency band is divided into two separate bands: A and B bands, with each band including 25 MHz bandwidth. The A band occupies 824–835 MHz and 845–846.5 MHz for subscriber station transmission and 869–880 MHz and 890–891.5 MHz for base station transmission. The B band occupies 835–845 MHz and 846.5–849 MHz for subscriber station transmission and 880–890 MHz and 891.5–894 MHz for base station transmission. In addition, the A and B bands are geographically provisioned by the FCC. The A and B bands have been allocated by the FCC to allow one service provider to occupy the A band and a different service provider to occupy the B band, thus allowing for some semblance of competition in the marketplace for mobile cellular communication providers within a given geographic area. Within each service provider's band and geographic area, the service provider may utilize any type of technology including frequency division multiple access (FDMA), time division multiple access (TDMA), code division multiple access (CDMA), or combination thereof.

In the United States PCS band, the frequency band is divided into six separate bands: A, B, C, D, E and F bands, with bandwidths totalling 30 MHz, 30 MHz, 30 MHz, 10 MHz, 10 MHz, and 10 MHz, respectively. The A band occupies 1850–1865 MHz for subscriber station transmission and 1930–1945 MHz for base station transmission. The B band occupies 1870–1885 MHz for subscriber station transmission and 1950–1965 MHz for base station transmission. The C band occupies 1895–1910 MHz for subscriber station transmission and 1975–1990 MHz for base station transmission. The D band occupies 1865–1870 MHz for subscriber station transmission and 1945–1950 MHz for base station transmission. The E band occupies 1885–1890 MHz for subscriber station transmission and 1965–1970 MHz for base station transmission. The F band occupies 1890–1895 MHz for subscriber station transmission and 1970–1975 MHz for base station transmission. The A, B, and C bands (MTA) are currently provisioned for use in metropolitan areas, while the D, E, and F bands (BTA) are provisioned for use in areas less populated. In addition, each of these sets of bands is geographically provisioned by the FCC. The A, B and C bands have been allocated by the FCC to allow one service provider to utilize one of the bands with different service providers utilizing the remaining bands. Likewise for the D, E, and F bands. Again, this allows for competition in the marketplace for PCS communication providers within a given geographic area. Within each service provider's band and geographic area, the service provider may utilize any type of technology including FDMA, TDMA, CDMA, or combination thereof.

Frequency division multiple access (FDMA) technology utilizes narrow and discreet channels within the frequency band. Different signals are assigned different frequency channels. Interference to and from adjacent channels is limited by the use of bandpass filters which pass the signal energy within the narrow channels while rejecting signals having other frequencies. The United States cellular system (AMPS) divides the allocated spectrum into 30 KHz bandwidth channels and uses FM modulation.

Time division multiple access (TDMA) technology also utilizes narrow and discreet channels within the frequency band. However, each channel is further divided into time slots in the time domain. This results in multiple users on the same frequency channel and increases the number of users per given channel.

Unlike FDMA or TDMA, code division multiple access (CDMA) involves multiple users simultaneously sharing a channel having relatively wide bandwidth. CDMA standards (IS-95) currently specify a CDMA channel having a bandwidth of 1.25 MHz. In CDMA, a large number of signals share the same frequency spectrum. Each signal consists of a different psuedorandom binary sequence that modulates a carrier signal (at the center frequency of the channel's spectrum). This spreads the spectrum of the waveform over the entire channel bandwidth. Use of CDMA technology allows for a larger number of signals than that used in FDMA or TDMA within the same amount of frequency spectrum.

Typically, service providers in PCS, cellular and other mobile applications divide the particular geographic region in which they are operating into "cells". This concept is well-known in the industry. Each cell contains a base station (including a transmitter and receiver) and services subscriber users within the boundaries of the cell. Each service provider is free to design its own coverage system including the locations and sizes of its cells, and this usually occurs. As a result, one cell of a first service provider may overlap completely or partially with a cell of another service provider. In FDMA and TDMA, adjacent cells must use channels having different frequencies to avoid interference. In CDMA technology, however, each cell may use all or any portion of the frequency spectrum allocated to the service provider.

All cellular systems were initially designed and deployed with FDMA or TDMA technology. Because no additional frequency spectrum has been allocated by the FCC, service providers desiring to use CDMA technology must utilize the same frequencies currently allocated. Using CDMA technology with FDMA or TDMA, in the current system, or use of CDMA in an all-CDMA system raises some interference problems. This interference is caused by out-of-band emission or intermodulation products of radio transmitters (both subscriber stations and base stations) of one service provider that are in or near the cell coverage area of another service provider.

As described earlier, each service provider within a particular geographic location may use either FDMA, TDMA (including GSM) or CDMA technology in its system and may use any number of cells and locations for its base stations in its system. This overlap increases the possibility of interference. Base stations and subscriber stations of a different technology or same technology operating at a different frequency band will produce out-of-band emission or intermodulation products. These out-of-band emission or intermodulation products may be strong enough to degrade the performance of a nearby channel that belongs to a different service provider. This problem is more acute when the two frequency bands are close to each other, such as adjacent or alternate bands. An example can be a GSM/TDMA/CDMA band A interference into CDMA band D (e.g. PCS) or CDMA band B (e.g. cellular), or an AMPS/TDMA/CDMA cellular band interference into CDMA cellular band.

One method of reducing interference in the cell of a first service provider that is caused by signals from subscriber stations and base stations of another service provider in or near the cell coverage area of the first service provider is to collocate the two base stations. Collocation occurs where each of the service providers locates their base stations for a particular coverage area at the same location (i.e. having their antenna's at the same place, such as on top of the same building or tower). Such collocation reduces the interference between the nearby channel base stations and may ensure that the subscriber stations receive a strong signal in comparison to the interference. The interference will be much weaker than the desired signal resulting in negligible or no degradation in the performance of the communication channel.

However, the aforementioned method has several disadvantages. First, each service provider may not agree to collocate with the other user, especially if one provider is experiencing less interference than the other provider. Second, collocation may not be feasible. Space at a particular location may be limited or the owner of the space may not desire to lease space to the other provider. Most importantly, since the current system for each provider has already been designed and deployed, it may be quite expensive for one or the other service providers to redesign the locations and sizes of their cells and entire system. This may be an expensive solution, since it puts limit on where the base stations may be deployed.

Accordingly, there exists a need for a system that avoids interference with subscriber stations and a base station of a service provider caused by out-of-band emissions and intermodulation products from subscriber stations and a base station of another service provider having a different technology or same technology and operating at a different frequency band. Furthermore, there is a need for such a system that does not require collocation of the base stations of the service providers.

SUMMARY OF THE INVENTION

According to the present invention, there is provided a communications cell having a base station that emits a base station signal for communicating with one or more subscriber stations within a predetermined geographic area. The base station and the one or more subscriber stations communicate with each other via a communications channel. An RF repeater operable with the base station is located substantially proximate a second base station that is emitting interference in the communications channel which is received by a subscriber station located near the second base station. Use of the RF repeater reduces or lessens the effects of the interference in the communications channel.

In another aspect of the present invention, there is provided a communications cell including a base station for communicating with one or more subscriber stations within a predetermined geographic area. The base station and the one or more subscriber stations communicate with each other via a communications channel. An RF repeater located substantially proximate a second base station provides a communications link between the base station and a subscriber station located near the second base station. The subscriber station emits interference into a communications channel of the second base station. Use of the RF repeater reduces the effects of the interference on the second base station's communications channel by reducing the transmit power of the subscriber station.

In yet another aspect of the present invention, there is provided a method of reducing or lessening the effects of interference on communications within a cell that is generated by an interference source located within or near the coverage area of the cell. A base station signal is transmitted from a base station located within the cell. The signal strength of base station signal at the location of a subscriber station near the interference source is such that the interference generated by the interference source interferes with communications directly between the subscriber station and the base station. An RF repeater located substantially proximate the interference source also receives the base station signal and re-transmits the base station signal for reception by the subscriber station located near the interference source. The signal strength of the base station signal transmitted from the RF repeater at the location of the subscriber station is sufficient to allow communication between the subscriber station and the base station via the RF repeater.

In another embodiment of the present invention there is provided a method for reducing the effects of interference on communications within a cell that is generated by an interference source located within or near the coverage area of the cell. The method includes the steps of transmitting a base station signal from a base station located within the cell, receiving the base station signal at an RF repeater, and transmitting the base station signal from the RF repeater to be received by a subscriber station located near the interference source. The base station signal transmitted from the RF repeater has a signal strength at the location of the subscriber station sufficient to allow communications between the subscriber station and the base station via the RF repeater. This reduce the effects of interference received by the subscriber station from the interference source.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

With reference to the drawings, like reference characters designate like or similar parts throughout the drawings.

Figure 1:
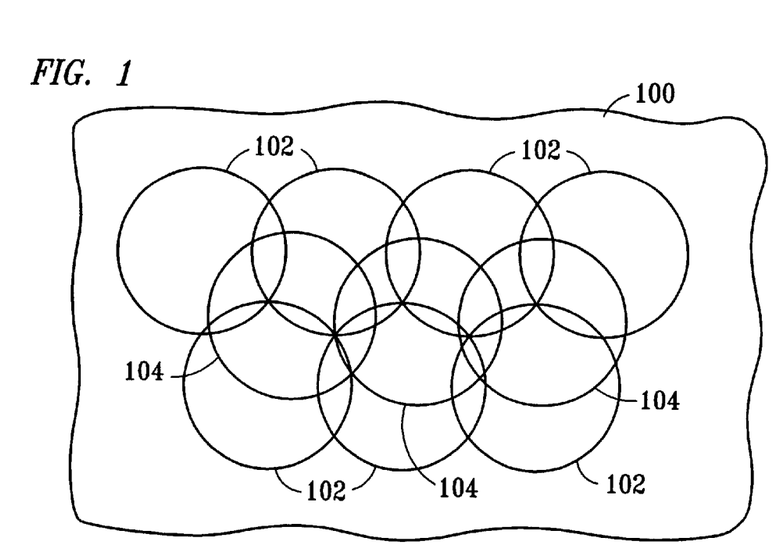
FIG. 1 is a diagram illustrating an example of cell layout of two communications service providers within a geographic area.

Now referring to FIG. 1, there is shown a geographic area 100 that includes a plurality of cells from at least two service providers—service provider A and service provider B. Service provider A has deployed a plurality of cells identified by reference numeral 102 and service provider B has deployed its own plurality of cells identified by reference numeral 104. As will be appreciated, each service provider is free to design and deploy its own system, including the number, location and sizes of cells, each including a base station. FIG. 1 is used only to illustrate one of numerous possible configurations in which the cells (and base stations) 102 of one service provider (A) overlap with the cells of another service provider (B) within a given geographic area 100.

Figure 2:
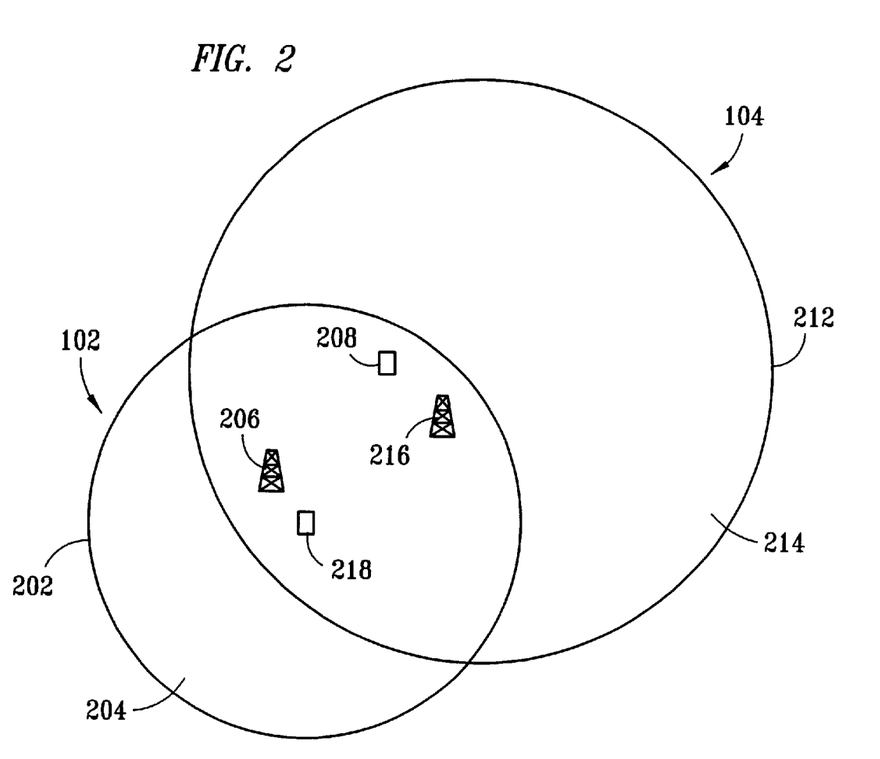
FIG. 2 illustrates a first cell of a first service provider overlapping a second cell of a second service provider.

Now referring to FIG. 2, there is illustrated a first cell 102 including a cell boundary 202 defining a coverage area 204 of a first service provider. The cell 102 includes a base station 206 and at least one subscriber station 208 operating within the coverage area 204 and communicating with the base station 206. A base station is sometimes referred to as a "BTS". It will be understood that the cell boundary 202 (identified by the solid line) may shift or change (is not static) resulting in a coverage area 204 that may shrink or grow, depending on the operating conditions. However, for illustration purposes only, the coverage area 204 shall be defined by the boundary 202 as shown by the solid line.

Also illustrated is a second cell 104 including a cell boundary 212 defining a coverage area 214 of a second service provider. The cell 104 includes a base station 216 and at least one subscriber station 218 operating within the coverage area 214 and communicating with the base station 216. It will be understood that the cell boundary 212 (identified by the solid line) may shift or change (is not static) resulting in a coverage area 214 that may shrink or grow, depending on the operating conditions. However, for illustration purposes only, the coverage area 214 shall be defined by the cell boundary 212 as shown by the solid line.

An interference problem arises when a non-collocated base station (usually owned or operated by another service provider) 216 exists within or near the cell coverage area 204 of the CDMA cell 102 and is operating near the frequency band of the CDMA cell 102. Interference caused by the operation of such nearby and overlapping cells is two-fold. Not only is there interference with the communications within the CDMA cell, but there is also interference with the communications within the other nearby and overlapping cell.

First, there is interference with the communications between the CDMA base station 206 and its subscriber station 208. This interference is caused mainly by the out-of-band emissions or intermodulation products of the base station 216 (an interference source) coupled with its close proximity to the subscriber station 208, and by the out-of-band emissions or intermodulation products of the subscriber station 218 (an interference source) coupled with its close proximity to the CDMA base station 206. The out-of-band emissions or intermodulation products of the base station 216 and the subscriber station 218 are actually within the frequency band of communication used for the CDMA base station 206 and the subscriber station 208.

Second, there is interference with the communications between the base station 216 and its subscriber station 218. This interference is caused mainly by the out-of-band emissions or intermodulation products of the CDMA base station 206 (an interference source) coupled with its close proximity to the subscriber station 218, and by the out-of-band emissions or intermodulation products of the subscriber station 208 (and interference source) coupled with its close proximity to the base station 216. The out-of-band emissions or intermodulation products of the CDMA base station 206 and the subscriber station 208 are actually within the frequency band of communication used for the base station 216 and the subscriber station 218.

As will be appreciated, it has been determined that such interference occurs in the mobile cellular band, PCS band or other mobile band when one of the cells utilizes CDMA technology and an adjacent and/or overlapping cell utilizes the same technology (CDMA) or different technology (FDMA, TDMA, GSM, AMPS, etc.). The interference problem is more severe when the frequency bands used by the first cell and the second cell are closer. In addition, there may be additional base stations and subscriber stations of other cells operating as a source of interference.

It will be understood that a person of ordinary skill in the art understands and is familiar with the standards and operation of CDMA technology as described in standards IS-95 (for cellular) and ANSI J-STD-008 (for PCS) which are hereby incorporated by reference. It is well-known that a CDMA channel includes a forward channel and a reverse channel.

The following examples, with continued further reference to FIG. 2, illustrates the degradation or interference in the performance of the CDMA communications within a first cell caused by a second cell (of another service provider) operating with the same or different technology at a frequency (or frequencies) near the frequency of operation of the CDMA cell with the second cell located adjacent and/or overlapping the CDMA cell (i.e. the location of the second cell base station is proximate or within the cell boundary of the first cell). Example one below illustrates interference with the subscriber station 208 reception of a desired signal transmitted from the base station 206.

In a first example, assume the effective radiated power (ERP) output from the base station 216 located near or within the cell 102 is 60 dBm (44 dBm base station output at 25 watts plus 16 dB of antenna gain) and the subscriber station 208 is at a given location such that there is a path loss of 50 dB between the base station 216 and the subscriber station 208. Assume that the output power from the base station 206 is 44 dBm (25 watts) and the antenna gain is 16 dB. In CDMA technology, all the power from the base station is not available for a single subscriber station with the maximum amount of power available per subscriber station at approximately 35 dBm (3 watts). Therefore the effective radiated power output from the base station 206 to the subscriber station 208 is about 51 dBm (35 dBm plus 16 dB). Also, assume that the given location of the subscriber station 208 produces a path loss of 150 dB between the subscriber station 208 and its base station 206. Also assume that the base station 216 outputs noise in the frequency band of operation of the cell 102 (i.e., the base station 206 and the subscriber station 208) at 60 dB below the ERP of 60 dBm of the base station 216. Thus, the base station 216 is outputting 0 dBm of interference power at the frequency of operation of the cell 102. Accordingly, the subscriber station 208 is receiving −50 dBm of interference from the base station 216 (0 dBm minus 50 dB).

As will be appreciated, CDMA technology generally requires a received signal level of about −120 dBm or better in order to distinguish the received signal from thermal noise (assuming no other significant interference). This is due to the known noise floor of about −113 dBm for the 1.25 MHz bandwidth of operation for one CDMA channel. As the number of users in a CDMA cell increases, the noise floor also increases exponentially, thus requiring received signals of increase strength in order to distinguish from the noise. This is one limitation of CDMA technology. Accordingly, there is a rule of thumb that to maintain a link between a base station and a subscriber station utilizing CDMA technology in a fading environment requires that the signal strength (power) of the desired signal received by the base station (or subscriber station) be about equal to or greater than the strength (power) of received interference (the interference plus signals from other users utilizing the CDMA channel) at the frequency of operation. In the example, to maintain a link between the base station 206 and the subscriber station 208, the desired signal must have a signal strength of at least about −100 dBm (in a relatively noise-free cell).

With the base station 216 outputting 0 dBm of interference and the subscriber station 208 located at a 50 dB path loss from the base station 216, the subscriber station 208 receives about −50 dBm of interference in its bandwidth of operation. As will be appreciated, the desired signal of interest (from the base station 206) received by the subscriber station 208 has a strength of only about −100 dBm (+51 dBm ERP minus 150 dB path loss). Receiving a desired signal of −99 dBm at the subscriber station 208 in addition to receiving −50 dBm of interference will be insufficient to allow communications between the subscriber station 208 and its base station 206. Accordingly, the base station 216 within the coverage area 204 of the cell 102, or located outside the coverage area 104 but near the cell boundary 202, interferes with the communications between the subscriber station 208 and the base station 206 in the CDMA cell 102. To obtain communications in this case, the transmit power of the base station 206 to the subscriber station 208 would have to be increased by 49 dB for a total transmit power of 99 dBm (ERP). Such an increase in transmit power is most likely not technically feasible and/or desirable.

In addition to the interference within the cell 102 caused by the non-collocated base station 216 within the cell 104, a subscriber station 218 associated with the base station 216 may also cause interference within the cell 102 if the subscriber station 218 is positioned near the base station 206 of the cell 102. Example two below illustrates interference with the base station 206 reception of a desired signal transmitted from the subscriber station 208.

In a second example, assume the total effective radiated power (ERP) output from the base station 206 is 60 dBm (44 dBm base station output plus 16 dB antenna gain) and the subscriber station 218 (of the other provider) is at a given location such that there is a path loss of 50 dB between the base station 206 and the subscriber station 218. In addition, the subscriber station 208 is at a given location with a path loss of 130 dB between the subscriber station 208 and its base station 206.

Current subscriber stations (for cellular applications) transmit at a typical maximum output power of about +23 dBm at the frequency (or bandwidth) of operation. Moreover, since subscriber stations are designed to operate over the entire frequency range of the cellular applications (or PCS frequency blocks), they generally output about −20 dBm of noise/interference at all other frequencies in the 1.25 MHz band during operation at maximum power. Accordingly, during operation of the subscriber station 218 (assuming operation at maximum power), the base station 206 receives interference from the subscriber station 218 of about −70 dBm (−20 dBm noise minus 50 dB path loss) at the frequency (or bandwidth) of operation of the base station 206.

Under normal relatively noise-free operation (without the subscriber station 218 present near the base station 206), the subscriber station 208 would be transmitting at a power level of about +14 dBm in order to ensure that the base station 206 was receiving a desired signal with a signal strength of −100 dBm (+14 dBm output power plus 16 dB antenna gain minus 130 dB path loss). However, because the base station 206 is receiving interference of about −70 dBm from the subscriber station 218, no communications can be maintained or established between the base station 206 and the subscriber station 208. Accordingly, the subscriber station 218 located within the coverage area 204 of the cell 102 and proximate the base station 206 interferes with the communications between the subscriber station 208 and the base station 206 in the CDMA cell 102 To obtain communications in this case, the base station 206 would normally inform the subscriber station 208 to increase its output power to a level (+44 dBm) that overcomes the interference. However, this is most likely not feasible because a subscriber station is generally limited to about +23 dBm output power.

Under a similar analysis, there is also interference with the communications within the cell 104 caused both by the non-collocated base station 206 (interference with the subscriber station 218) and by the subscriber station 208 (interference with the base station 216) associated with the base station 206 when the subscriber station 208 is positioned proximate the base station 216 of the cell 104.

A problem with interference also arises when one base station of a first CDMA macrocell is collocated with another base station of a second macrocell (another service provider) and a third base station of a microcell which is within the first CDMA macrocell coverage area (not shown). Typically such microcells are used to cover a high traffic area by the competing service provider. In this case, there is a possibility that the microcell base station may cause interference with subscriber stations associated with the first CDMA macrocell which are close to it. This depends on the guardband between the frequency of the victim CDMA macrocell and the offending microcell, the path loss (or distance) between the CDMA macrocell base station and the microcell base station, and the path loss (or distance) between the victim subscriber station and the microcell base station. The interference from the microcell base station typically will force the CDMA macrocell to allocate more traffic power to its subscriber stations, hence, reducing the CDMA forward link capacity, and coverage area of the CDMA macrocell.

Figure 3:
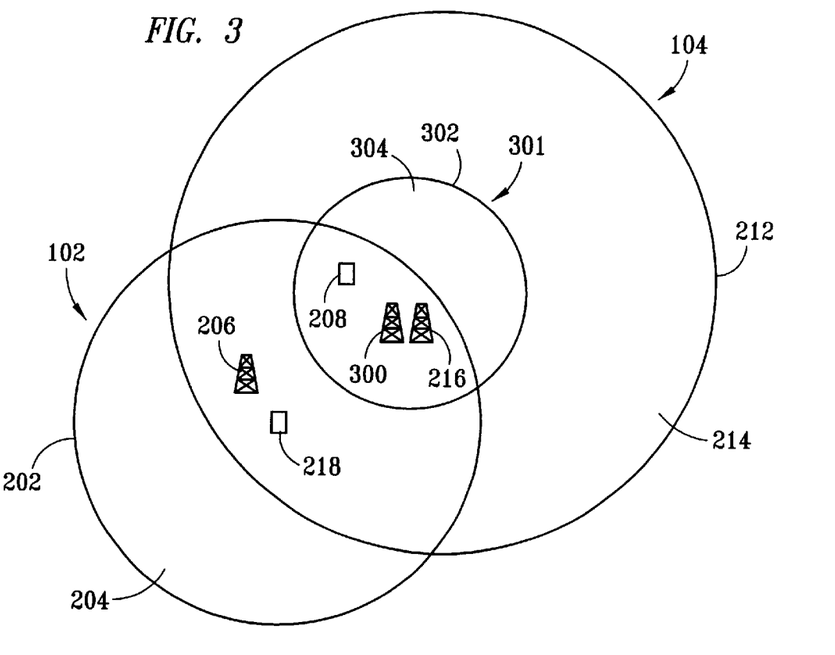
FIG. 3 illustrates the use of an RF repeater in accordance with the present invention.

Now referring to FIG. 3, there are the two communication cells 102, 104, as set forth in FIG. 1, with the addition of an RF repeater 300 in accordance with the present invention. The RF repeater 300 is located at or near the base station 216 of the cell 104. The RF repeater 300 is collocated with the base station 216 or located very near the base station 216. Deployment of the RF repeater 300 at or near the base station 216 reduces the effects of the noise/interference caused by the non-collocated base station 216 (i.e., not collocated with base station 206) on subscriber stations associated with the cell 102 which are operating from locations proximate the base station 216.

In general terms, an RF repeater acts as an intermediary between a base station and a subscriber station. For the forward link, the RF repeater receives the transmitted base station signal over a wireless or wire (such as a coaxial or fiber optic cable) interface and re-transmits the base station signal over an antenna of the RF repeater. For the reverse link, the RF repeater receives the subscriber station signal re-transmits the subscriber station signal to the base station.

The RF repeater 300 generates a repeater cell 301 having a repeater boundary 302 defining a repeater coverage area 304. It will be understood that the repeater boundary 302 (identified by the solid line) may shift or change (is not static) resulting in a repeater coverage area 304 that may shrink or grow, depending on the operating conditions. However, for illustration purposes only, the repeater coverage area 304 shall be defined by the repeater boundary 302 as shown by the solid line. The RF repeater 300 is a bi-way amplifier and its construction is well known in the industry. Such RF repeaters may be obtained from manufacturers such as Andrews, Ortel, Allgon, Repeater Technologies, Allen Telecom, and possibly others.

The following description illustrates how utilization of the RF repeater 300 combats, or reduces the effects of, interference in a CDMA cell caused by a non-collocated base station located within the coverage area, or near the cell boundary of a CDMA cell. Using the first example discussed supra, and the noise figures associated with the base stations and subscriber stations therewith, it is shown that the RF repeater 300 combats or reduces the impact of the interference. Assume that the output power of the RF repeater 300 is 44 dB (25 watts) and the antenna gain is 16 dB. All of the power is not available for a single subscriber station with the maximum amount of power available per subscriber station at approximately 35 dBm (3 watts). Therefore the ERP output from the RF repeater 300 to the subscriber station is about 51 dBm (35 dBm plus 16 dB). Since the RF repeater 300 is located at or near the offending base station 216, the path loss between the subscriber station 208 and the base station 216 is about 50 dB. Therefore, the strength of the desired signal received by the subscriber station 208 from the RF repeater 300 is about +1 dBm (51 dBm output minus 50 dB path loss). Note that the subscriber station 208 still receives interference from the base station 216 of about −50 dBm (0 dBm interference output power minus 50 dB path loss) as in example one. However, the +1 dBm desired signal is much larger than the −50 dBm interference resulting in proper communications between the subscriber station 208 and the base station 206—only now via the RF repeater 300. Accordingly, the RF repeater 300 combats or reduces the effects of interference received by the subscriber station 208 operating at a given location near the base station 216 (an offending interference source). The RF repeater 300 provides a good link between the subscriber station 208 and the base station 206 of the CDMA cell 102.

In addition to lessening or reducing the effects of the interference on communications within the CDMA cell 102, the RF repeater 300 reduces interference with the base station 216 within the cell 104 (CDMA, FDMA, TDMA, AMPS, GMS, etc. technology cell). Such interference (as similarly described above with respect to subscriber station 218 and base station 206) is caused by the subscriber station 208 operating near the base station 216. Use of the RF repeater 300 reduces the transmit power of the subscriber station 208 (and other applicable subscriber stations nearby) thereby reducing the power of the interference generated by the subscriber station 208 and received by the base station 216.

Figure 4:
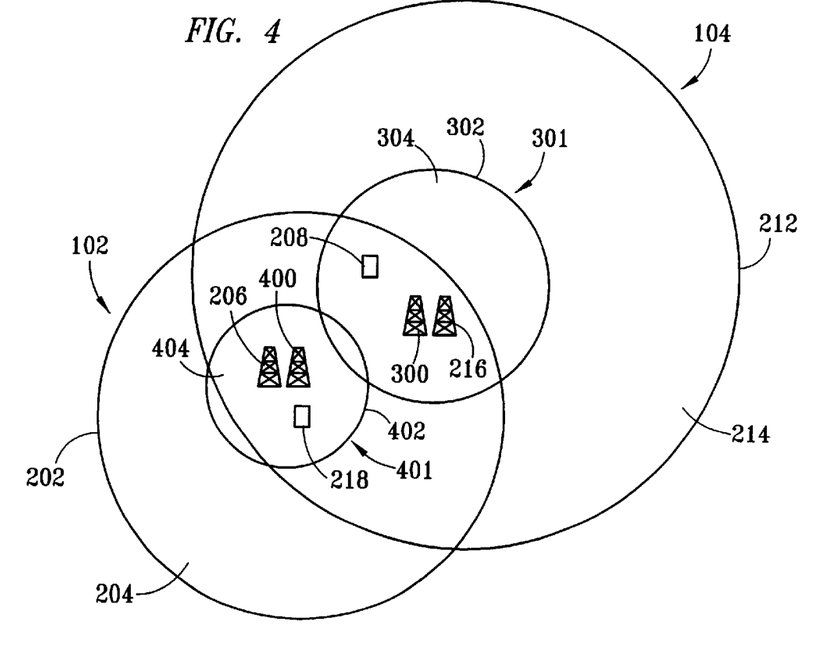
FIG. 4 illustrates an alternative embodiment of the present invention.

Now referring to FIG. 4, there is illustrated an alternative embodiment of the present invention. The two communication cells 102, 104 as set forth in FIG. 3 further include an RF repeater 400 in accordance with the present invention. The RF repeater 400 is located at or near the base station 206 of the cell 102. The RF repeater 400 is collocated with the base station 206 or located very near the base station 206. Deployment of the RF repeater 400 at or near the base station 206 reduces the effects of the noise/interference (received by the base station 206) caused by the subscriber station 218 associated with the cell 104 that is operating from a location proximate the base station 206.

The RF repeater 400 generates a repeater cell 401 having a repeater boundary 402 defining a repeater coverage area 404. It will be understood that the repeater boundary 402 (identified by the solid line) may shift or change (is not static) resulting in a repeater coverage area 404 that may shrink or grow, depending on the operating conditions. However, for illustration purposes only, the repeater coverage area 404 shall be defined by the repeater boundary 402 as shown by the solid line.

The following description illustrates how utilization of the RF repeater 400 combats or reduces the effects of interference in a CDMA cell caused by a subscriber station associated with a second base station of another service provider and which is located near the base station 206 of the CDMA cell. Using the second example supra, and the noise figures associated with the base stations and subscriber stations therewith, it is shown that the RF repeater 400 combats or reduces said interference. Assume that the ERP output from the RF repeater 400 to its subscriber station is 51 dBm (34 dBm plus 16 dB). Since the RF repeater 400 is located at or near the base station 206, the path loss between the subscriber station 218 and the base station 206 is about 50 dB. Note that without the RF repeater 400, the subscriber station 218 would be operating at about maximum power and generating interference of about −20 dBm, with the base station 206 receiving interference from the subscriber station 218 of about −70 dBm (−20 dBm noise minus 50 dB path loss) in the frequency (or bandwidth) of operation of the base station 206. However, with the subscriber station 218 located near and operating through the RF repeater 400, the subscriber station will only output enough power necessary for a communication link with the RF repeater 400, most likely around −20 dBm or less, not the maximum output power of +23 dBm. Accordingly, the noise interference which was about −20 dBm at maximum power will now be reduced approximately proportionately to about −63 dBm (−20 dBm minus 43 dB). Therefore, the base station 206 is receiving interference of about −113 dBm (−63 dBm minus 50 dB path loss). Since it is desirable for the base station 206 to receive about −100 dBm from the subscriber station 208 for proper communications, and the interference received by the base station 208 is about −113 dBm, the RF repeater 400 has reduced the interference within the CDMA cell 102 caused by the subscriber station 218 (of another service provider).

Accordingly, the RF repeater 400 transmits the offending non-collocated base station 216 signal near the victim base station 206, forcing all the subscriber stations associated with the offending base station 216 which are near the victim base station 206 to transmit at a lower power. This will result in a lower interference level from the offending subscriber stations 218 received by the victim base station 206.

In addition to reducing the interference with the communications within the CDMA cell 102, the RF repeater 400 also lessens or reduces the effects of interference on the subscriber station 218 within the cell 104 (CDMA, FDMA, TDMA, AMPS, GMS, etc. technology cell). Such interference (as similarly described above with respect to base station 216 and subscriber station 208) is caused by the base station 216 operating near the subscriber station 218. Use of the RF repeater 400 increases the power of the base station signal received by the subscriber station 218 thereby reducing or lessening the effects of the interference generated by the base station 206 and received by the subscriber station 218.

As will be appreciated, the RF repeater 300 and the RF repeater 400 (as illustrated in FIGS. 3 and 4) are both utilized to help reduce or lessen the interference caused by base stations and subscriber stations of respective overlapping cells of different providers. While use of both RF repeaters 300, 400 is preferred, this may not always be desirable or feasible, for example, as one service provider may not desire to use an RF repeater. In such a case, deployment of an RF repeater at or near the location of an offending base station will still help reduce or lessen the interference caused by the non-collocated offending base station.

In the case where there is a microcell base station inside the coverage area of a CDMA macrocell (not shown), an RF repeater may be positioned at or near the location of the offending microcell base station. Like the previous case, the RF repeater re-transmits the CDMA macrocell base station signal. Even though the subscriber stations still receive strong interference from the microcell base station, the level of interference will be below the received CDMA signal from the RF repeater, resulting in maintaining the forward link capacity. Note that no RF repeater is needed near the victim base station, since any offending subscriber station which is near the victim base station shall be in communication with the base station which is close to the victim base station. This will result in low transmit power for these subscriber stations and low interference level into the victim base station.

The use of an RF repeater in a CDMA cell as described above may impact both the reverse link and the forward link of a base station. It will be understood that by adjusting the RF Repeater forward path and reverse path gains (i.e., amplification gain, as well as the antenna gain) as well as its noise figure, any impact may be minimized. The following describes how the use of an RF repeater may impact both the reverse link and the forward link of the CDMA communications channel.

The noise contribution of an added RF repeater, through its noise figure, may degrade the reverse link budget of the base station. The noise power of the RF repeater will be amplified by the RF repeater's reverse path amplifier and antenna gains and the base station antenna gain. However, the free space path loss between the RF repeater and the base station helps by attenuating the added noise input of the RF repeater.

Figure 5:
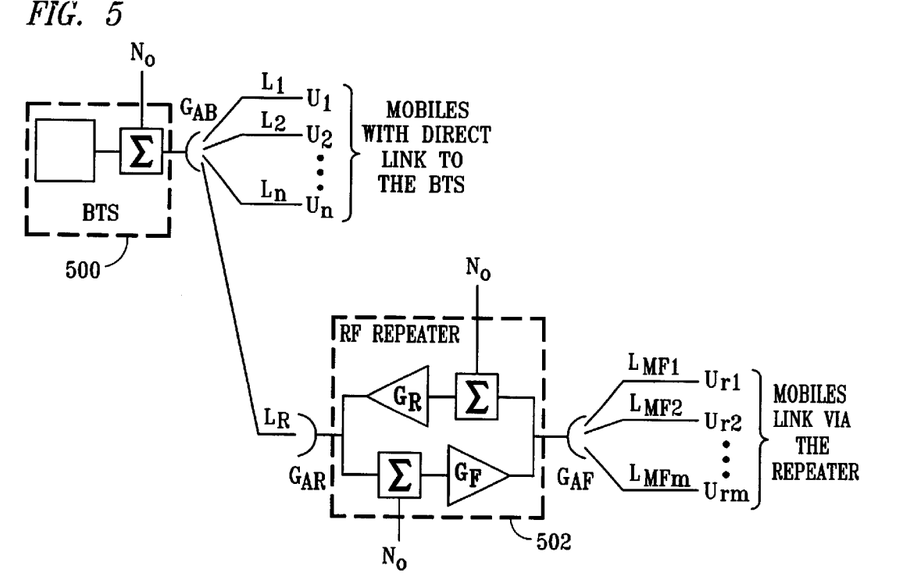
FIG. 5 is a block diagram of a base station and an RF repeater within a cell.

Now referring to FIG. 5 there is illustrated a block diagram of a base station 500 and an RF repeater 502.

Depicted in FIG. 5 are typical gains (G) and losses (L) in such a system. Assume that the RF repeater 502 has a reverse path noise figure of $N_r$, a reverse path amplifier gain of $G_R$, and a reverse path antenna directivity gain of $G_{AR}$. Also assume that the base station 500 antenna gain is $G_{AB}$ and the path loss between the base station 500 and the RF repeater 502 is $L_R$. Assuming that the input thermal noise power of the RF repeater 502 is $N_O$ (in 1.25 MHz bandwidth), then the noise power $N_{ib}$ at the input to the base station 500 is given as:

$$N_{ib}=(N_o+N_r)+G_R+G_{AR}-L_R+G_{AB} \quad (1)$$

The factors that increase the noise power $N_{ib}$ are the RF repeater noise figure $N_r$, the gain $G_R$, and the antenna directivities $G_{AR}$ and $G_{AB}$. The factor that decreases the noise power is the path loss $L_R$. From the above equation, it is understood that in order to mitigate the impact of the RF repeater reverse noise path contribution, the following relation must hold:

$$N_r+G_R+G_{AR}+L_R+G_{AB}<<0 \quad (2)$$

As an example, assume that the RF repeater 502 has a noise figure $N_r$ of 10 dB, a combined gain of 70 dB ($G_R+G_{AR}$), a path loss $L_R$ of 100 dB, and a base station 500 antenna gain $G_{AB}$ of 15 dB. Therefore, the total noise power $N_{ib}$ at the input to the base station 500 will increase by 1.2 dB.

Note that the requirement of Equation (2) will result in having the RF repeater 502 act more like an attenuator than an amplifier (its gain+path loss). This forces all the subscriber stations ($U_{r1}$ through $U_{rm}$) which are in communication with the base station 500 through the RF repeater 502 to increase their transmit power to combat the combined loss of the amplifier gain and the path loss. However, the transmit power of the subscriber stations ($U_{r1}$ through $U_{rm}$) through the RF repeater 502 will be much smaller than their transmit power if they were to try to keep their link directly to the base station 500.

It will be understood that in cells utilizing CDMA technology, the noise floor+interference of the base station 500 is dependent on the amount of the interference that it receives (which is dependent on the cell load, and the out-of-cell subscriber station interference). Accordingly, when the network designer is analyzing and determining the link budget for a cell utilizing an RF repeater in accordance with the present invention, this factor should be taken into account.

For the forward link capacity impact, assume that the RF repeater 502 has a forward path noise figure of $N_f$ a forward path gain of $G_F$, an antenna directivity gain of $G_{AF}$ (forward path), and an input thermal noise power of $N_o$ (in 1.25 MHz bandwidth), then its forward path output noise power $N_{of}$ (at the RF repeater 502 antenna output) is given as:

$$N_{of}=(N_o+N_f)+G_F+G_{AF} \quad (3)$$

The noise power $N_{of}$ acts as interference to the subscriber stations that are in communication with the base station 500 through the RF repeater 502. Assuming that the forward path loss between a subscriber station and the RF repeater 502 is $L_{MF}$, then the noise power $N_{im}$ at the input to the subscriber station is given as:

$$N_{im}=(N_o+N_f)+G_F+G_{AF}-L_{MF}+N_o \quad (4)$$

The second $N_o$ in the above equation is the subscriber station thermal noise power. The factors that increase the noise power $N_{im}$ are the RF repeater 502 noise figure $N_f$, the gain $G_F$, and the antenna directivity gain $G_{AF}$. The factor that decreases the noise power $N_{im}$ is the path loss $L_{MF}$. From the above equation, it is understood that in order to mitigate the impact of the RF repeater forward noise path contribution, the following relation must hold:

$$N_f + G_F + G_{AF} - L_{MF} << 0 \quad (5)$$

The path loss $L_{MF}$ is not a fixed number. It will decrease as the subscriber station gets closer to the RF repeater 502. At relatively close distances, Equation (5) does not hold thereby resulting in a RF repeater noise contribution that is above the thermal noise floor of the subscriber station. However, two factors improve this situation. The first factor is that the subscriber station will be relatively close to the RF repeater 502 thus resulting in low transmit power to maintain the link to the base station 500. The second factor is that in an embedded system, the noise+interference level of the subscriber station is above its thermal noise floor, resulting in less contribution from the RF repeater 502 to the overall noise+interference of the subscriber station.

As an example, assume that the RF repeater 502 has a noise figure $N_f$ of 10 dB, a combined gain of 40 dB ($G_F + G_{AF}$, the antenna is probably omni-directional), and a path loss $L_{MF}$ of 60 dB. Then, the total noise power $N_{im}$ at the input to the subscriber station will increase by 0.4 dB. However, if the path loss $L_{MF}$ drops to 40 dB, then the total noise power $N_{im}$ at the input to the subscriber station will increase by 10.4 dB. For PCS frequencies, 40 dB is just over one meter from the antenna of the RF repeater, and subscriber stations will not be used that close to the RF repeater.

Accordingly, when the network designer is analyzing and determining the link budget for a cell utilizing an RF repeater in accordance with the present invention, the above may need to be taken into account.

A simulation has been performed to analyze the impact of the addition of an RF repeater on the forward link capacity and the quality of service (QOS) of a CDMA cell. For the simulation:

| | |
|---|---|
| CDMA cell TX power: | 12 W |
| CDMA cell Antenna: | Omni-directional at 9 dB gain |
| Interference Location: | 119.4 dB to the CDMA cell |
| Interference ERP: | −5 dBm in the CDMA channel |
| RF Repeater TX Power: | +10 dBm |
| RF Repeater area: | 1% of the CDMA cell size (some mobiles were deliberately located in this area, see below) |
| RF Repeater Location: | Same as the interference source |
| RF Repeater Antenna Gain: (Repeater to subscriber station) | Omni-directional at 9 dB |
| RF Repeater Antenna Gain: (Repeater to base station) | Directive at 20 dB |
| RF Repeater Noise Figure: | 8 dB |

The simulation was run in an embedded system where the CDMA cell under test was surrounded by forty-seven (47) other CDMA cells (omnicells).

Figure 6:
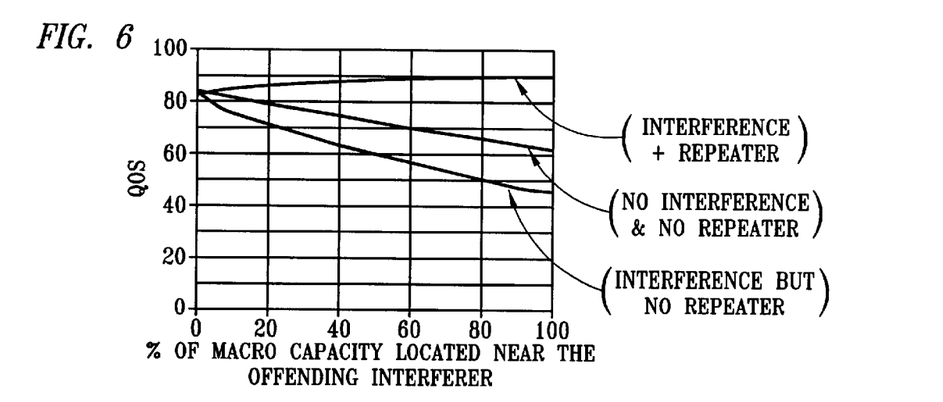
FIG. 6 illustrates in graphical form the quality of service of a cell with and without use of an RF repeater.

Now referring to FIG. 6, there is a graph illustrating the quality of service (QOS) versus the percentage of the cell's capacity located near the interference source (in this case, a base station of another provider that is located within the coverage area of the CDMA cell). The QOS is compared for three cases: (1) for a CDMA cell alone (without any interference or RF repeater), (2) for the CDMA cell with an interferer having −5 dBm of power in the CDMA channel, but no RF repeater, and (3) for the CDMA cell with an interferer (same power level) and an RF repeater collocated or located near the offending interferer.

Quality of service (QOS) is defined as:

$$QOS = \frac{N}{N+X}$$

where N is the number of subscriber stations which are in communication with the CDMA cell base station and X is the number of subscriber stations within the CDMA cell coverage area that fail to keep their communication with the CDMA cell base station. In each case, a percentage of the subscriber stations were deliberately located near the offending source. For the cases 1 and 2, the QOS decreases as the percentage of subscriber stations near the offending interference source increases, as depicted in FIG. 6. As clearly illustrated, the QOS is worse when there is an offending source in the CDMA cell. However, the addition of the RF repeater at or near the offending interference source in accordance with the present invention significantly improves the QOS of the CDMA cell, as illustrated in FIG. 6.

Figure 7:
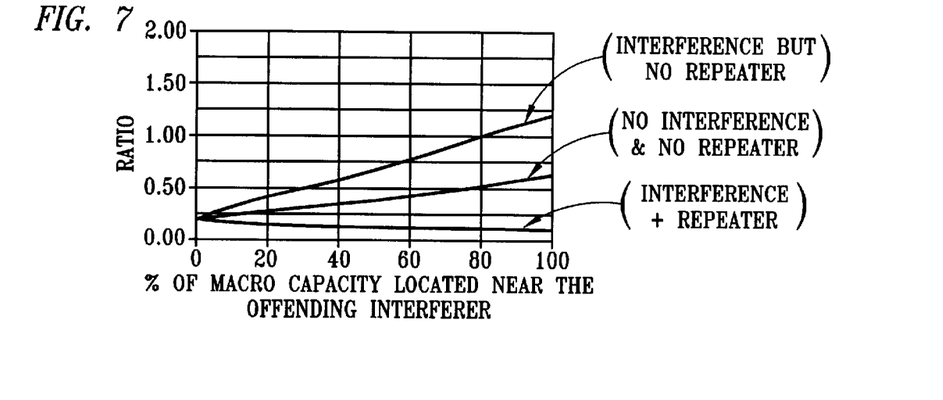
FIG. 7 illustrates in graphical form the ratio of failed users to the capacity of a cell with and without use of an RF repeater.

Now referring to FIG. 7, there is a graph illustrating the ratio of failed users (failed to establish a link to the CDMA cell base station) versus the percentage of the cell's capacity located near the interference source for the above-identified three cases in the simulation. As illustrated by FIG. 7, the probability of failing to establish a link between the subscriber station and the CDMA cell base station is higher when there is an offending interference source located within or near the cell boundary of the CDMA cell coverage area. However, the use of an RF repeater in accordance with the present invention significantly reduces this probability, thus improving the reliability of communications in the CDMA cell by reducing or lessening the impact of the interference in the cell.

The impact of interference caused by other service providers may be serious with CDMA technology since it may impact the link budget and shrink the coverage of a CDMA cell. To lessen or reduce the effects of such interference, an RF repeater is deployed at or near a base station (of another service provider) that is causing the interference. The RF repeater helps maintain a good link to the subscriber stations by increasing the strength of the signal received by the subscriber stations. It also forces the subscriber stations to operate at low transmit power thereby decreasing their out-of-band emission or intermodulation products and reducing interference received by the offending base station. A second RF repeater deployed by the other service provider and positioned at or near the base station will result in the offending subscriber stations operating at low transmit power thereby decreasing their out-of-band emission or intermodulation products and reducing interference into the base station.

The addition of an RF repeater performs two major functions. First, the RF repeater transmits a strong base station signal to the subscriber stations located near the offending base station. This reduces the effects of the interference generated (or emitted) by the offending base station and received by the subscriber stations. This also effectively increases the coverage area of the cell. Second, the RF repeater acts as a surrogate receiver for the base station. Since the RF repeater is closer to the subscriber stations than is the base station, a weaker transmit signal from the subscriber stations may be used which allows a decrease in their transmit power thereby decreasing the interference generated by the subscriber stations and received by the offending base station.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A communications cell, comprising:
    a first base station emitting a base station signal for communicating with one or more subscriber stations within a predetermined geographic area, the first base station and the one or more subscriber stations communicating with each other via a communications channel; and
    a radio frequency (RE) repeater operable with the first base station and located substantially proximate an interference source, the interference source being a second base station, the RF repeater for reducing the effects of interference emitted from the interference source and received by a subscriber station located near the interference source, wherein operation of the RF repeater as a communications link between the first base station and the subscriber station located near the second base station reduces interference emitted from the subscriber station and received by the second base station by allowing the subscriber station located near the second base station to transmit at a lower power.

2. A communications cell, comprising:
    a first base station emitting a base station signal for communicating with one or more subscriber stations within a predetermined geographic area, the first base station and the one or more subscriber stations communicating with each other via a communications channel;
    a first radio frequency (RF) repeater operable with the first base station and located substantially proximate an interference source, the interference source being a second base station, the first RF repeater for reducing the effects of interference emitted from the interference source and received by a subscriber station located near the interference source; and
    a second RF repeater operable with the second base station and located substantially proximate the first base station for providing a communications link between the second base station and a second subscriber station located near the first base station, the second RF repeater reducing interference emitted by the second subscriber station into the communications channel and received by the first base station by allowing the second subscriber station to transmit at a lower power, thereby reducing interference with the communications channel between the one or more subscriber stations and the first base station.

3. A communications cell in accordance with claim 2 wherein the communications channel is a code division multiple access (CDMA) channel.

4. A communications cell in accordance with claim 2 wherein operation of the second RF repeater as a communications link between the second base station and the second subscriber station located near the first base station reduces the effects of interference emitted from the first base station and received by the second subscriber station.

5. A communications cell in accordance with claim 4 wherein operation of the RF repeater as a communications link between the base station and the subscriber station located near the second base station reduces interference emitted from the subscriber station and received by the second base station by allowing the subscriber station located near the second base station to transmit at a lower power.

6. A communications cell, comprising:
    a first base station for communicating with one or more subscriber stations within a predetermined geographic area, the first base station and the one or more subscriber stations communicating with each other via a communications channel;
    a first radio frequency (RF) repeater located substantially proximate a second base station and for providing a communications link between the first base station and a subscriber station located near the second base station, the second base station emitting interference into the communications channel thereby interfering with establishment or maintenance of a direct link between the subscriber station and the first base station, the first RF repeater reducing the effects of the interference on communications between the subscriber station and the first base station; and
    a second RF repeater operable with the second base station and located substantially proximate the first base station for providing a communications link between the second base station and a second subscriber station located near the first base station, the second RF repeater reducing interference emitted by the second subscriber station into the communications channel and received by the first base station by allowing the second subscriber station to transmit at a lower power, thereby reducing interference with the communications channel between the one or more subscriber stations and the first base station.

7. A communications cell in accordance with claim 6 wherein the communications channel is a code division multiple access (CDMA) channel.

8. A communications cell in accordance with claim 6 wherein operation of the second RF repeater as a communications link between the second base station and the second subscriber station located near the first base station reduces the effects of interference emitted from the first base station and received by the second subscriber station.

9. A communications cell in accordance with claim 8 wherein operation of the RF repeater as a communications link between the first base station and the subscriber station located near the second base station reduces interference emitted from the subscriber station and received by the second base station by allowing the subscriber station located near the second base station to transmit at a lower power.

10. A method for reducing the effects of interference on communications within a cell that is generated by an interference source located within or near the coverage area of the cell, comprising the steps of:
    transmitting a base station signal from a base station located within the cell, the base station signal having a signal strength at a location of a subscriber station near the interference source such that the interference generated by the interference source interferes with communications directly between the subscriber station and the base station;
    receiving the base station signal at a radio frequency (RF) repeater located substantially proximate the interference source; and
    re-transmitting from the RF repeater the base station signal to be received by the subscriber station located near the interference source, the base station signal transmitted from the RF repeater having a signal strength at the location of the subscriber station near the interference source sufficient to allow communications between the subscriber station and the base station via the RF repeater.

11. A method in accordance with claim 10 wherein the communications between the subscriber station and the base station are code division multiple access (CDMA) and use a CDMA channel.

12. A method in accordance with claim 11 wherein the interference source produces RF signals having frequencies in the frequency band of the CDMA channel.

13. A method in accordance with claim 10 wherein the interference source is a second base station.

14. A method in accordance with claim 13 further comprising the step of:

using a second RF repeater to provide a communications link between a second subscriber station located near the base station and the second base station, the second RF repeater located substantially proximate the base station and reducing the transmit power of the second subscriber station thereby reducing interference generated by the second subscriber station and received by the base station.

15. A method for reducing the effects of interference on communications within a cell that is generated by an interference source located within or near the coverage area of the cell, comprising the steps of:

transmitting a base station signal from a first base station located within the cell;

receiving the base station signal at a radio frequency (RF) repeater;

transmitting the base station signal from the RF repeater to be received by a first subscriber station located near the interference source, the interference source being a second base station, the base station signal transmitted from the RF repeater having a signal strength at the location of the first subscriber station near the interference source sufficient to allow communications between the first subscriber station and the first base station via the RF repeater, thereby reducing the effects of interference received by the first subscriber station from the interference source; and receiving at a second RF repeater a subscriber station signal from a second subscriber station located near the first base station, the second RF repeater located substantially proximate the first base station and providing a communications link between the second subscriber station and the second base station and reducing the transmit power of the second subscriber station thereby reducing interference generated by the second subscriber station and received by the first base station.

16. A method in accordance with claim 15 wherein the second subscriber station produces RF signals having frequencies in the frequency band of a code division multiple access (CDMA) reverse channel of the first base station.

* * * * *